United States Patent
Aaron

(10) Patent No.: US 7,810,158 B2
(45) Date of Patent: Oct. 5, 2010

(54) METHODS AND SYSTEMS FOR DECEPTIVELY TRAPPING ELECTRONIC WORMS

(75) Inventor: Jeffrey A. Aaron, Atlanta, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 1448 days.

(21) Appl. No.: 11/013,598

(22) Filed: Dec. 16, 2004

(65) Prior Publication Data

US 2006/0137012 A1 Jun. 22, 2006

(51) Int. Cl.
*G06F 11/00* (2006.01)
*G06F 9/00* (2006.01)

(52) U.S. Cl. .......................... 726/24; 726/11
(58) Field of Classification Search ............... 726/24, 726/11
See application file for complete search history.

(56) References Cited

U.S. PATENT DOCUMENTS

| | | | | |
|---|---|---|---|---|
| 5,696,822 A * | 12/1997 | Nachenberg | | 726/24 |
| 5,960,170 A * | 9/1999 | Chen et al. | | 714/38 |
| 6,108,799 A * | 8/2000 | Boulay et al. | | 714/38 |
| 6,357,008 B1 * | 3/2002 | Nachenberg | | 726/24 |
| 6,611,925 B1 * | 8/2003 | Spear | | 714/38 |
| 6,981,279 B1 * | 12/2005 | Arnold et al. | | 726/22 |
| 7,080,408 B1 * | 7/2006 | Pak et al. | | 726/24 |
| 7,159,149 B2 * | 1/2007 | Spiegel et al. | | 714/43 |
| 7,231,667 B2 * | 6/2007 | Jordan | | 726/23 |
| 7,269,851 B2 * | 9/2007 | Ackroyd | | 726/24 |
| 7,325,251 B1 * | 1/2008 | Szor | | 726/22 |
| 7,457,965 B2 * | 11/2008 | Tamura et al. | | 713/182 |
| 7,523,501 B2 * | 4/2009 | Liang | | 726/24 |
| 7,549,166 B2 * | 6/2009 | Baffes et al. | | 726/23 |
| 2002/0073330 A1 * | 6/2002 | Chandnani et al. | | 713/200 |
| 2003/0172291 A1 * | 9/2003 | Judge et al. | | 713/200 |
| 2004/0088564 A1 * | 5/2004 | Norman | | 713/200 |
| 2004/0117478 A1 * | 6/2004 | Triulzi et al. | | 709/224 |
| 2004/0215977 A1 * | 10/2004 | Goodman et al. | | 713/201 |
| 2004/0255165 A1 * | 12/2004 | Szor | | 713/201 |
| 2005/0005153 A1 * | 1/2005 | Das et al. | | 713/200 |
| 2005/0050378 A1 * | 3/2005 | Liang | | 714/4 |
| 2005/0108415 A1 * | 5/2005 | Turk et al. | | 709/232 |
| 2005/0177736 A1 * | 8/2005 | de los Santos et al. | | 713/188 |
| 2006/0031937 A1 * | 2/2006 | Steinberg | | 726/24 |
| 2006/0064755 A1 * | 3/2006 | Azadet et al. | | 726/24 |
| 2006/0107321 A1 * | 5/2006 | Tzadikario | | 726/22 |
| 2006/0123244 A1 * | 6/2006 | Gheorghescu et al. | | 713/188 |

* cited by examiner

*Primary Examiner*—Techane J Gergiso
(74) *Attorney, Agent, or Firm*—Myers Bigel Sibley & Sajovec, P.A.

(57) ABSTRACT

Methods of trapping electronic worms are provided. Pursuant to these methods, an electronic worm may be "trapped" such that its ability to spread is reduced or eliminated, while at the same time the worm is deceived such that it does not realize it has been trapped. In this manner, the probability that the worm enacts countermeasures that are harmful to the data and/or equipment of the infected computing devices may be reduced. Corresponding systems of trapping electronic worms are also provided.

10 Claims, 7 Drawing Sheets

METHODS AND SYSTEMS FOR DECEPTIVELY TRAPPING ELECTRONIC WORMS

FIELD OF THE INVENTION

The present invention relates to network and computer security and, more particularly, to methods and systems for protecting computer networks against electronic worms.

BACKGROUND OF THE INVENTION

Electronic worms ("worms") are software programs, processes and/or computational entities that are designed to spread via self-propagation techniques throughout one or more computer networks. Such worms infect one or more computers in the network(s) and then probe for new targets to infect. When a vulnerable new target (e.g., computer) is located, the worm "infects" the new target by transferring a copy of itself into the new target. The copy of the worm at the newly-infected target then begins to probe for its own targets to infect. The targets may comprise, for example, any type of wireless or wired computing device.

Many worms are designed to search the computers that they infect for financial or other information (e.g., credit card numbers, bank account information, passwords, social security numbers, etc.). The worm may then transmit this information to, for example, the person who unleashed the worm to facilitate one or more fraudulent enterprises. Other worms are purely destructive in nature such as, for example, worms that are designed to propagate and then perform destructive actions to the machines that the worm has infected and/or to simultaneously send out large volumes of messages to overload a communications network. Numerous other types of worms also exist.

In propagating itself throughout a network of computers, an electronic worm may send one or more of a variety of different types of communications. For instance, a worm may first send out communications that are often referred to as "initial probes" that may be used to detect the presence of a target computer. These initial probes may, for example, try to connect to a port on the computer (i.e., find a port where the computer is listening to network traffic). Once such a potential target is detected, more detailed probing of the target may be performed to determine if the target is vulnerable to infection. For example, there may be known vulnerabilities in certain types of operating systems or other software that may leave a target computer susceptible to infection. The detailed probing may be used by the worm to detect whether or not the target computer includes such an operating system and/or software program. Often, the worm may probe for multiple vulnerabilities, such as a first vulnerability that may allow an initial infection and a second vulnerability that will facilitate a complete transfer of the worm to the target computer. Once a vulnerable target computer is identified, the worm may then attempt to perform an initial intrusion of the target. This is often accomplished by sending a small piece of the worm to the target by taking advantage of the known vulnerability. This small piece of the worm then attempts to take sufficient control of the target computer such that the target computer will accept one or more subsequent communications from the worm which transfer the entire worm to the target computer so as to complete the infection thereof. In addition, during any stage of the infection process signaling may occur between the computer seeking to infect a target computer and the target computer regarding the progress of the infestation. Additionally, an electronic worm may also send and/or receive communications from its creator.

Each infected target may become a new source of the worm contagion. As a result, worms may spread in an exponentially increasing fashion as more and more copies of the worm spread to additional computing devices and search for new targets to infect. Moreover, when actions are taken to slow or stop the spread of a worm, some worms may be designed to detect such countermeasures and respond by taking actions that may be harmful to the data and/or equipment associated with one or more of the infected computing devices. By way of example, immediately upon detecting that countermeasures are being applied to prevent a worm from spreading, the worm may alter or delete many or all of the data and/or files on the infected computing device. Alternatively, upon detection the worm may start altering and/or deleting the data and files at a slow rate, as, over time, this may allow the worm to inflict more damage over the entire network (since the rapid deletion of data and files is more likely to alert network security administrators who will act to stop the spread of the worm). Still other worms may cause mechanical actions to be performed on one or more infected computing devices such as, for example, continuous disk drive head manipulation, which can wear out or damage hardware resident on the target computing device. Worms also may act to delete data and/or damage equipment prior to detecting countermeasures. However, as such actions increase the likelihood that the worm will be detected and subsequently subjected to countermeasures, many worms do not act to alter or destroy data and/or attack hardware prior to detection.

Given their multi-sourced, self-propagating characteristics, certain worms can be difficult to safely contain using conventional approaches. The task of containing worms may become more difficult as more and more worms incorporate capabilities to retaliate by, for example, deleting data and/or damaging hardware in response to detection of efforts to block spread of the worm.

SUMMARY OF THE INVENTION

Methods of trapping electronic worms are provided. Pursuant to these methods, an electronic worm may be "trapped" such that its ability to spread is reduced or eliminated, while at the same time the worm is deceived such that it does not realize, it has been trapped. In this manner, the probability that the worm enacts countermeasures that are harmful to the data and/or equipment of the infected computing devices may be reduced.

In certain embodiments of the methods of the present invention, operations may begin with the detection of an electronic worm in an infected computer. The electronic worm is then trapped, for example, by intercepting at least some of the communications that were previously sent by the electronic worm. Then, one or more communications are sent to the trapped electronic worm. The communications that are sent to the electronic worm may, for example, be responses to communications sent by the trapped electronic worm. By sending responses to the communications that the electronic worm sends out it may be possible to prevent the electronic worm from detecting that it has been trapped. Responses may be configured to partially or fully mimic the responses the worm would expect to receive as a result of the worm communications, for example the responses may be configured to appear to come from the intended destination of the worm communications and/or to contain data and/or messages the worm would expect to receive in response to the communications sent by the worm.

In certain embodiments of the present invention, the methods may further include collecting information on the actions of the electronic worm. This collected information may then be correlated with a data repository of information on the actions of known electronic worms, and, in certain situations, it may be possible to identify the electronic worm as one of a known type of electronic worm based on the correlation. In other instances, the collected information may be used to update the data repository.

Other embodiments of the present invention provide methods for blocking communications from an electronic worm. Pursuant to these methods, a probe sent by the electronic worm may be detected. This detected probe is then blocked from reaching its intended destination. Additionally, a response to the probe is generated and forwarded to the electronic worm. In certain embodiments, the blocked probe is forwarded to a deceptive-responder that prepares and sends a response to the probe that is configured to mimic the response to the probe that the electronic worm would have expected to receive. In some instances, these methods may further involve intercepting additional probes from the electronic worm. These intercepted probes may then be correlated with a database of information on the probing characteristics of known worms in order to identify the type of worm that has been detected.

Pursuant to still further embodiments of the present invention, systems for trapping electronic worms are provided which include a probe detector, a database containing information on the probing characteristics of certain known types of worms, a probe analyzer that is coupled to the probe detector and to the database, a worm communications interceptor that is responsive to the probe analyzer and a deceptive-responder that is responsive to the worm communications interceptor.

As will further be appreciated by those of skill in the art, while described above primarily with reference to method aspects, the present invention may be embodied as methods, systems and/or computer program products. Furthermore, other systems, methods and/or computer program products according to embodiments will be or become apparent to one with skill in the art upon review of the following drawings and detailed description. It is intended that all such additional systems, methods and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
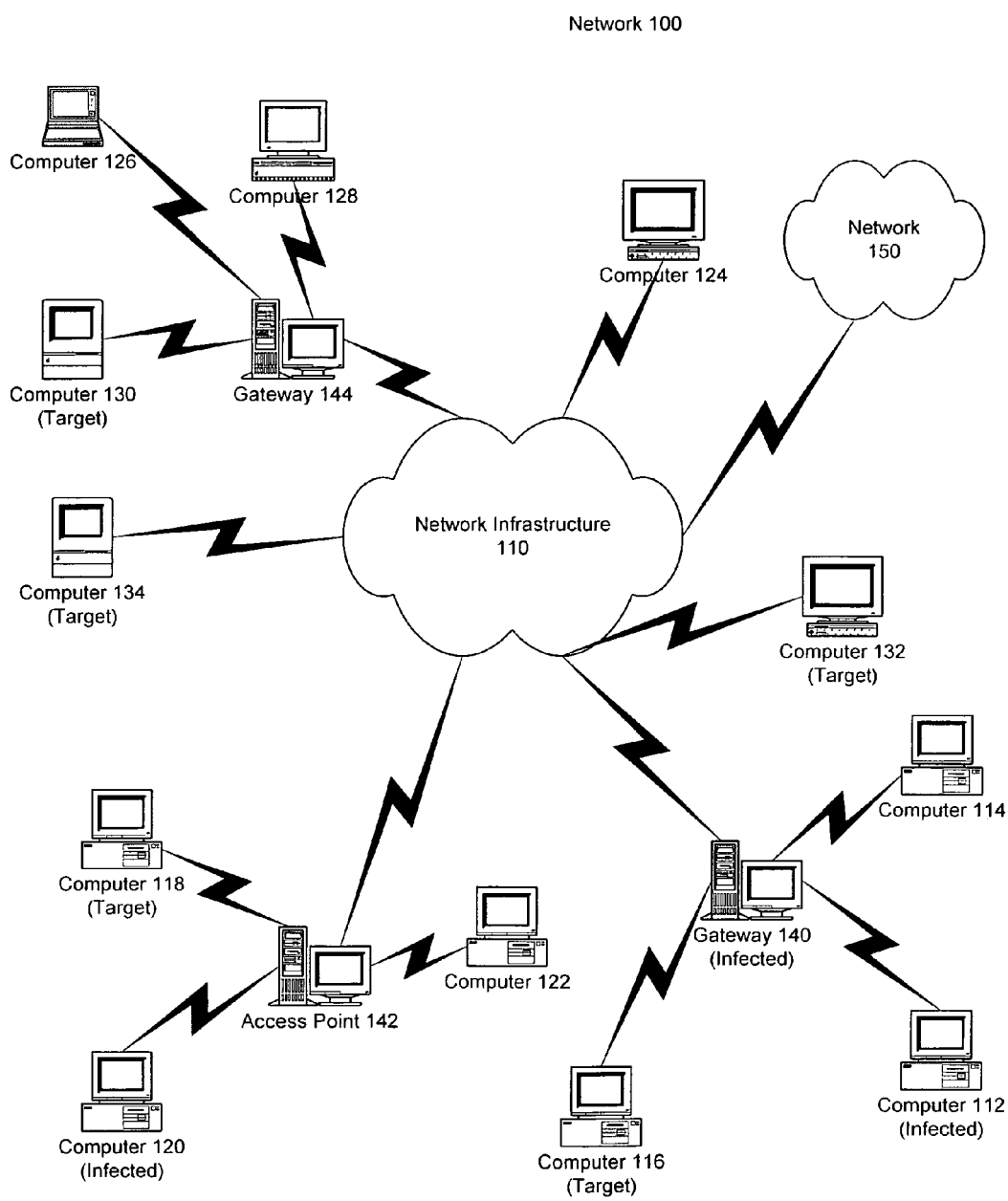
FIG. 1 is a network diagram illustrating an exemplary network computing environment in which methods and systems according to certain embodiments of the present invention may be practiced.

Embodiments of the present invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the present invention may be embodied as a method, data processing system, or computer program product. Accordingly, the present invention may take the form of entirely software embodiments or embodiments combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be implemented using programmable aspects of existing application programs. Aspects of the computer program code may also be written in an object oriented programming language such as Java®, Smalltalk or C++ and/or using a conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. FIG. 1 is a block diagram illustrating an exemplary (and vastly simplified) computer network 100 in which the systems and methods according to embodiments of the present invention may be used. The computer network 100 includes network infrastructure 110 which may comprise, among other things, one or more routers and/or network servers and a plurality of wired and/or wireless communication links. The network infrastructure 110 may be used to transmit communications from and to a plurality of computing devices (e.g., computers, servers, wireless telephones, PDAs, etc.) 112, 114, 116, 118, 120, 122, 124, 126, 128, 130, 132, 134 that are interconnected via wired and/or wireless connections to the network infrastructure 110. As is further shown in FIG. 1, the computing devices 112, 114, 116, 118, 120, 122, 124, 126, 128, 130, 132, 134 maybe connected directly to the network or may be connected via intervening elements such as, for example, gateways 140, 144 or access point 142. As used herein, the term "gateway" may include routers, switches, bridges, firewalls, and other network elements. Additionally, the computer network 100 will typically be directly or indirectly connected to numerous other computer networks such as the network 150 illustrated in FIG. 1.

In the exemplary computer network 100 of FIG. 1, three of the computing devices (computing devices 112, 120 and gateway 140) are identified as "infected computers." Herein, the term "infected computer" is used to denote a computing device that has an operable electronic worm residing thereon. Other of the computing devices in FIG. 1 (computing devices 116, 118, 130, 132, 134) are identified as "target computers." As used herein, the term "target computer" is used to denote a computing device that an electronic worm resident on an infected computer has sent at least one probe. As used herein, the term "probe" may include any communication and/or type of communication that may be initiated by the electronic worm, specifically including any communication involved in its efforts to propagate itself to one or more target computers. Typically, an electronic worm directs probes to multiple target computers (typically a very large number of target computers). Worms may use a wide variety of different initial probing strategies including, for example, (1) sending probes to network addresses where target computers are known to reside or (more typically) (2) systematically sending probes to large number of randomly selected network addresses (e.g., incrementing the IP address by one for each new probe; probing all of the computers within a certain company or sub-network, finding network addresses by examining the e-mails in the infected computer, etc.).

As noted above, pursuant to embodiments of the present invention, methods, systems and computer program products are provided for detecting infections of one or more target computers by an electronic worm and then taking actions to reduce and/or minimize the number of new computers that are infected by the electronic worm. Such "trapping" of the electronic worm may be accomplished by preventing the worm from at least one of (1) sending probes to target computers, (2) receiving responses to probes, (3) intruding into vulnerable target computers in an effort to achieve sufficient control of such targets and/or (4) transferring itself to target computers. In addition to trapping the electronic worm, further measures may be taken to deceive the worm into believing that it is still successfully probing and/or intruding into and infecting additional target computers. In this manner, a worm may eventually be trapped in a virtual box such that it cannot spread, while at the same time preventing the worm from realizing that it has been trapped, thereby reducing the probability that the worm will initiate destructive countermeasures before the worm is removed from the target computer(s).

Figure 2:
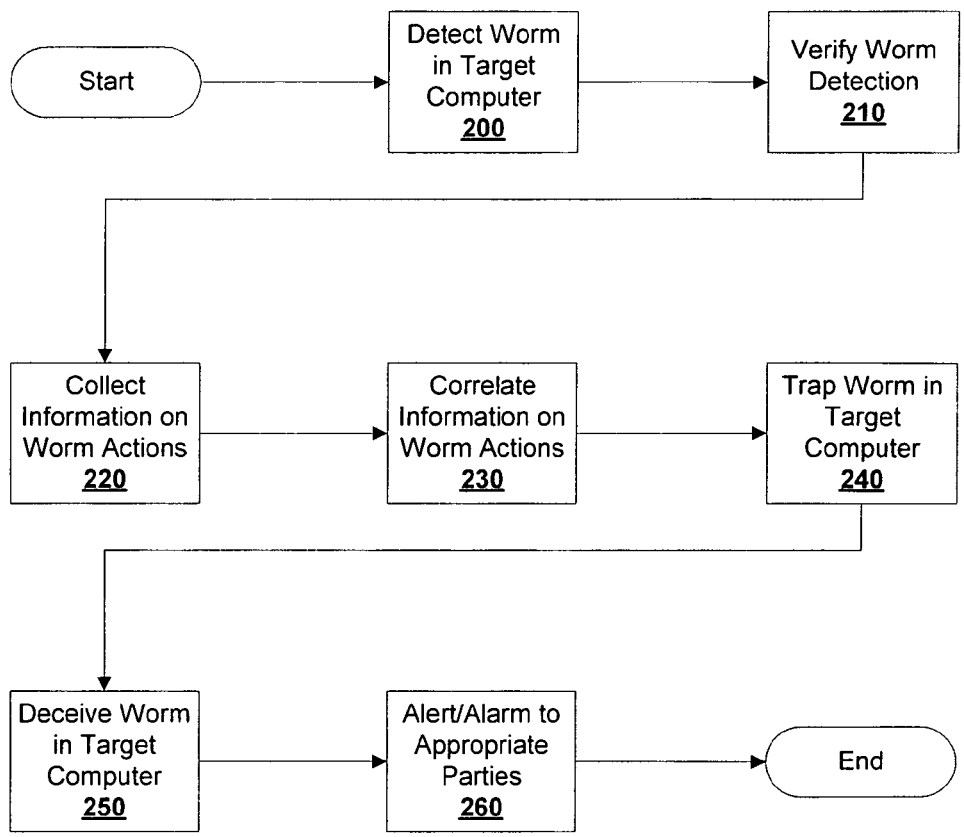
FIG. 2 is a flowchart illustrating operations for deceptively trapping an electronic worm according to certain embodiments of the present invention.

FIG. 2 illustrates operations for trapping electronic worms according to certain embodiments of the present invention. As shown in FIG. 2, operations may begin with the detection of an electronic worm in a target computer or other computing or communications device (block 200). Efforts to detect electronic worms can be enhanced when it is realized that electronic worms typically have a number of common characteristics that are provided to facilitate one of the overriding goals of many worms, which is to propagate itself to as many computers as possible. For instance, worms almost always are designed to exploit vulnerabilities in the hardware and/or software of target computers. In many instances these vulnerabilities are known (at least generally). Thus, efforts to exploit these known vulnerabilities may be monitored as a method of detecting new worms. As another example, worms generally avoid spoofing (sending out probes with false "from" addresses) as worms typically expect to receive responses to at least some of the probes that they send since, as discussed herein, in order to propagate worms often have to exchange a series of communications with a target computer. Correct return addresses are typically needed by the network in order to allow responses to probes to be properly routed back to the probe originator, i.e. the worm. As such, the probes typically include correct return address information, which can facilitate identification of computers that are infected by the worm. As yet another example, often probes from electronic worms will be sent to multiple ports at the same destination address and/or to multiple destination addresses that are related in some way (e.g., a sequence of destination addresses that vary by one character or a set of destination addresses that are related by an algorithm). Worms also typically probe and spread quickly and on a wide scale, which can make initial detection of the worm (and verification of the initial detection) easier.

Given these common characteristics of many electronic worms, one potential method for detecting such worms is to examine outbound network communications to identify probes that appear to be electronic worm communications. In certain embodiments of the present invention, software and/or hardware may be located at network access points, gateways or other locations within the network that detect, for example, relatively rapid and/or consistent non-spoofed probing of other computing devices within the network (or in connected networks) and/or communications that may be designed to exploit a known vulnerability of popular hardware or software. In other embodiments, software and/or hardware resident on the target computer itself could monitor for, and detect, such non-spoofed probing. In still other embodiments of the present invention, the electronic worm could be detected via the examination of one or more individual computing devices for the presence of electronic worms (i.e., the worms could be identified by the code that is stored in memory or elsewhere on the infected computer as opposed to by identification of communications that are sent by the electronic worm). This detection approach may be used, for example, when a particular type of electronic worm is known to reside in certain places in the memory of computing devices and/or has certain known characteristics such as, for example, identifiable code strings sometimes termed "signatures" in the art, that may make it relatively easy to identify without examining any communications that the worm causes to be sent.

As is also shown in FIG. 2, in certain embodiments of the present invention, upon detecting the electronic worm, efforts may be made to verify the detection (block 210). One method of accomplishing such verification is to identify additional computers that also appear to contain a copy of the electronic worm. This might be accomplished, for example, by examining communications emanating from computers on the same local area network as the identified infected computer (as such computers are likely targets for the electronic worm) to determine if any of those computers are sending similar probes. In other embodiments of the present invention, communications from the infected computer may be examined to identify computers that have recently received messages from the infected computer. Communications from these computers may then be analyzed to determine if any of these computers are sending out probes or exhibiting other characteristics that indicate that they have been successfully infected by the electronic worm.

As further shown in FIG. 2, in certain embodiments of the present invention information regarding the actions of the electronic worm is collected (block 220). This may be accomplished, for example, by identifying multiple probes sent by the electronic worm to, for example, other target computers in order to characterize the different types and formats of communications sent by this particular type of electronic worm. The information collected via this information gathering process may then be correlated with stored information regarding the actions of other worms (block 230). As discussed herein, in certain embodiments of the present invention, a centralized correlator may be provided that correlates information regarding the observed actions of a newly identified electronic worm with stored information regarding the expected actions of a number of known types of electronic worms. Based on this correlation, it may be possible to identify the electronic worm as being a specific type of worm or as belonging to a specific class of worms. In cases where the correlation suggests that the worm is a known type of worm, probe events from multiple sources may be examined to further verify that the worm has been correctly identified. Once this is done, an identification number associated with the known worm type may be associated with the newly identified worm. In other cases, it may be possible to identify the electronic worm as belonging to a specific class of electronic worms that share similar properties, although this worm may not exactly correlate with any of the known worms in the class. In this case, the electronic worm may be treated as a new type of worm, and information regarding the actions of the worm such as, for example, the worm's probing and spreading patterns and the contents of probes, may be gathered and stored in a database or other data repository. A new identification number may then be assigned to the electronic worm. The new worm identification number and the associated probing pattern information may then be communicated to trapping-enabled modems, gateways, software agents, computers and the like so that such trapping-enabled equipment in the network may more quickly identify new instances of computers that are infected with this particular electronic worm.

Still referring to FIG. 2, operations may continue at block 240 with the trapping of the electronic worm in one or more infected computers. By "trapping" it is meant that the capability of the electronic worm resident on a particular infected computer to spread to other target computers is reduced or eliminated. This trapping may be accomplished, for example, by applying pre-configured rules associated with the specific type of electronic worm that has been identified (or associated with the specific class of worm to which the identified electronic worm belongs). Pursuant to certain embodiments of the present invention, the trapping may involve one or more of the following activities: (1) blocking further outbound probing by the electronic worm, (2) blocking inbound replies to previously sent outbound probes, (3) blocking efforts by the electronic worm to perform an initial intrusion into vulnerable target computers and/or (4) blocking efforts by the electronic worm to transfer itself to the target computers. In this manner, the ability of the electronic worm to further propagate to new target computers may be degraded or stopped altogether.

The trapping of the electronic worms may be done at the computing device on which the worm is resident and/or elsewhere in the network. In certain embodiments of the present invention, the trapping may be performed in the network, for example in a network router/switch/firewall, as this may reduce the probability that the worm may detect the trapping actions being taken against the worm.

As shown in FIG. 2, according to embodiments of the present invention, actions may be taken to deceive the electronic worm (block 250). For example, certain actions may be taken that will reduce the possibility that the electronic worm can determine that actions are being taken to trap the electronic worm in the target computer. In certain embodiments of the present invention, the deception may be accomplished by tunneling (e.g., forwarding) worm communications to a "deceptive-responder." (Note that in many instances the trapping may involve blocking outgoing probes from the electronic worm, in which case this tunneling step may be accomplished by simply diverting the probes from their intended destination to the deceptive-responder while retaining the initial "from" and "to" address information). The deceptive-responder may then formulate "falsified" responses that are sent back to the electronic worm. These falsified responses may be designed to look similar to or identical to responses that the electronic worm would have expected to receive in response to its probes. As the worm is receiving the types of responses that it had expected to receive, the worm may be unable to detect that it has been partially or completely trapped and instead will believe that it is still probing and spreading normally. This may reduce the probability that the electronic worm will enact counter-measures such as the deletion of data and/or files and/or the instigation of actions that may be harmful to the hardware of the infected computer. Further, it may reduce the probability that the worm will responsively alter its functions to expend extra efforts in an attempt to operate more stealthily so as to hide/obscure its activities and/or to otherwise circumvent trapping in some fashion.

Finally, as is also shown in FIG. 2, an alert or an alarm may be raised at some point after the detection of the worm in the infected computer. For example, an alert may be sent to one or more authoritative parties that have an interest in learning that an electronic worm has been detected on one or more target computers in the network. Examples of such authoritative parties include owners and/or operators of infected computing devices, owners and/or operators of target (but not yet infected) computers, security response teams, security administrators and the like. In certain embodiments of the present invention, alerts may be provided in situations in which efforts to deceptively trap the electronic worm appear to be working, whereas alarms may be raised in situations in which efforts to trap the electronic worm appear to be unsuccessful or if it appears that the worm may be aware that trapping efforts are under way, as for example if the worm has noticeably changed to more stealthy operation subsequent to a trapping attempt.

A variety of different criteria may be examined in deciding whether to raise an alert or an alarm. By way of example, when it has not been possible to identify a worm with complete specificity, this tends to indicate a lower likelihood that efforts to deceive the worm will be successful. In such a situation, it may be appropriate in some instances to raise an alarm instead of an alert. The same situation may exist when the communications from the worm do not track the expected communications from the worm as recorded in a database of information. Additionally, it may be detected that the worm is repeating communications, which may be an indicator that the falsified responses that are sent to the worm are not working. Accordingly, based on these and various other criteria, a decision may be made as to whether to send an alert or raise an alarm.

It will be appreciated that the operations depicted in FIG. 2 need not be carried out in the exact order shown in FIG. 2. Thus, for example, the alert/alarm operation which is shown as the last operation in the flow chart of FIG. 2 may in fact be raised at any point in the process. Numerous other changes to the order of the operations could also be made.

Figure 3:
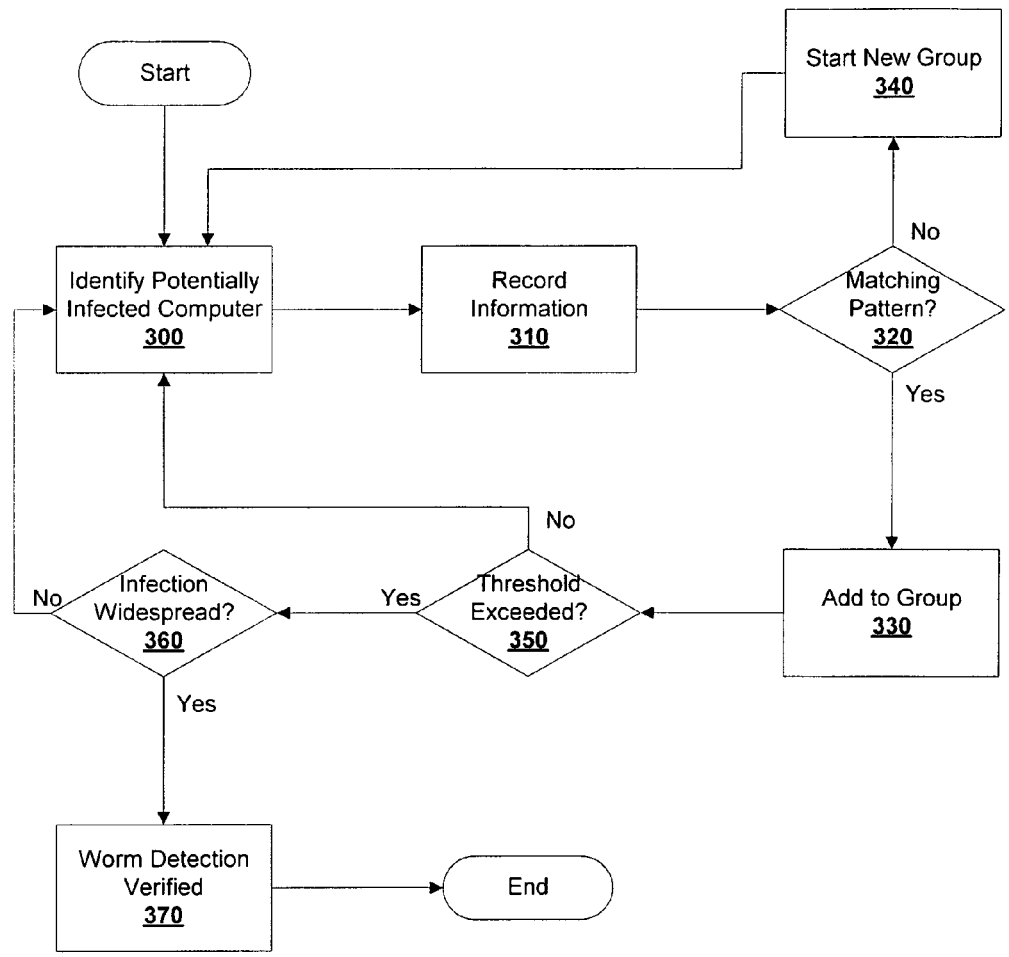
FIG. 3 is a flowchart illustrating operations for verifying a detection of a worm according to certain embodiments of the present invention.

FIG. 3 is a flow chart that illustrates in more detail methods according to embodiments of the present invention for verifying that an electronic worm has been detected (i.e., for carrying out the step of "verify worm detection" at block 210 of FIG. 2). As shown in FIG. 3, operations may begin at block 300 with the identification of a potentially infected computer. When this occurs, information regarding the potential worm infection may be recorded in a database or other data storage unit (block 310). The recorded information may include various information regarding the potentially infected computer and/or the probes or other indicia that led to the identification of the potential infection. Thus, for example, information regarding the identity and/or location of the potentially infected computer, information regarding patterns associated with communications from the potentially infected computer (such as probe and/or probe response patterns and/or spreading patterns) and/or information regarding the name or identification designation/number or type of worm, or the class of the worm if the exact designation or type is not determinable or not yet determinable, that is suspected as being resident on the potentially infected computer may be recorded during the operations of block 310.

Next, a determination may then be made as to whether or not the patterns (e.g., probing and/or spreading patterns) associated with communications from the potentially infected computer are substantially the same as patterns associated with the communications from other potentially infected computers (block 320). If the worm at the newly identified potentially infected computer exhibits substantially the same pattern as is exhibited by other potentially infected computers, the newly identified potentially infected computer is grouped with the other potentially infected computers that exhibit substantially the same pattern (block 330). If not, a new group may be started with the newly identified potentially infected computer as the only instance of what appears to be a new type of worm (block 340).

As is also shown in FIG. 3, at least periodically, the number of potentially infected computers included in each group may be examined to determine if the number exceeds a threshold (block 350). This threshold may be a configurable threshold, and the actual threshold may be different for different types of suspected worms. For example, for certain types of highly destructive and/or very fast spreading electronic worms, a very low threshold might be used so that the countermeasures, for example probe blocking and/or probe response blocking and/or mimicked responses, may be implemented against these types of worms quickly, even if it means that in some situations the system may incorrectly conclude that an infestation is occurring. With other types of worms that are, for example, less destructive and/or dangerous, higher thresholds may be used to decrease the likelihood that a false positive identification of an infestation occurs. The threshold value might likewise, for example, be varied depending upon the predictability of the behavior of the electronic worm (i.e., the more predictable the behavior, the lower the value of the threshold).

If at block 350 of FIG. 3 the number of computers that appear to possibly be infected with a particular type of worm is less than the threshold, no countermeasures are taken and operations may continue at block 300 with the continued identification of newly identified potentially infected computers. If, on the other hand, the threshold is exceeded, a second determination may be made at block 360 according to certain embodiments of the present invention as to whether or not the number of sources (i.e., potentially infected computers) exhibiting the identified pattern are "widespread." The determination as to whether or not their appears to be a widespread infection may be made based on a variety of different criteria such as, for example, the number of subnetworks that appear to include potentially infected computers, the geographic spread of the infected computers (which is often determinable from the network addresses of the potentially infected computers), etc. If the "widespread" infection criteria are satisfied, verification of the worm detection may be considered accomplished (block 370). If not, operations may resume with the identification of another potentially infected computer at block 300.

While the flow chart of FIG. 3 is provided to explain aspects which may be included in certain embodiments of the present invention, it will be realized that all of the operations depicted in FIG. 3 need not be carried out in each implementation of the present invention and that, in fact, the verification process may be omitted in its entirety in certain embodiments of the present invention.

Figure 4:
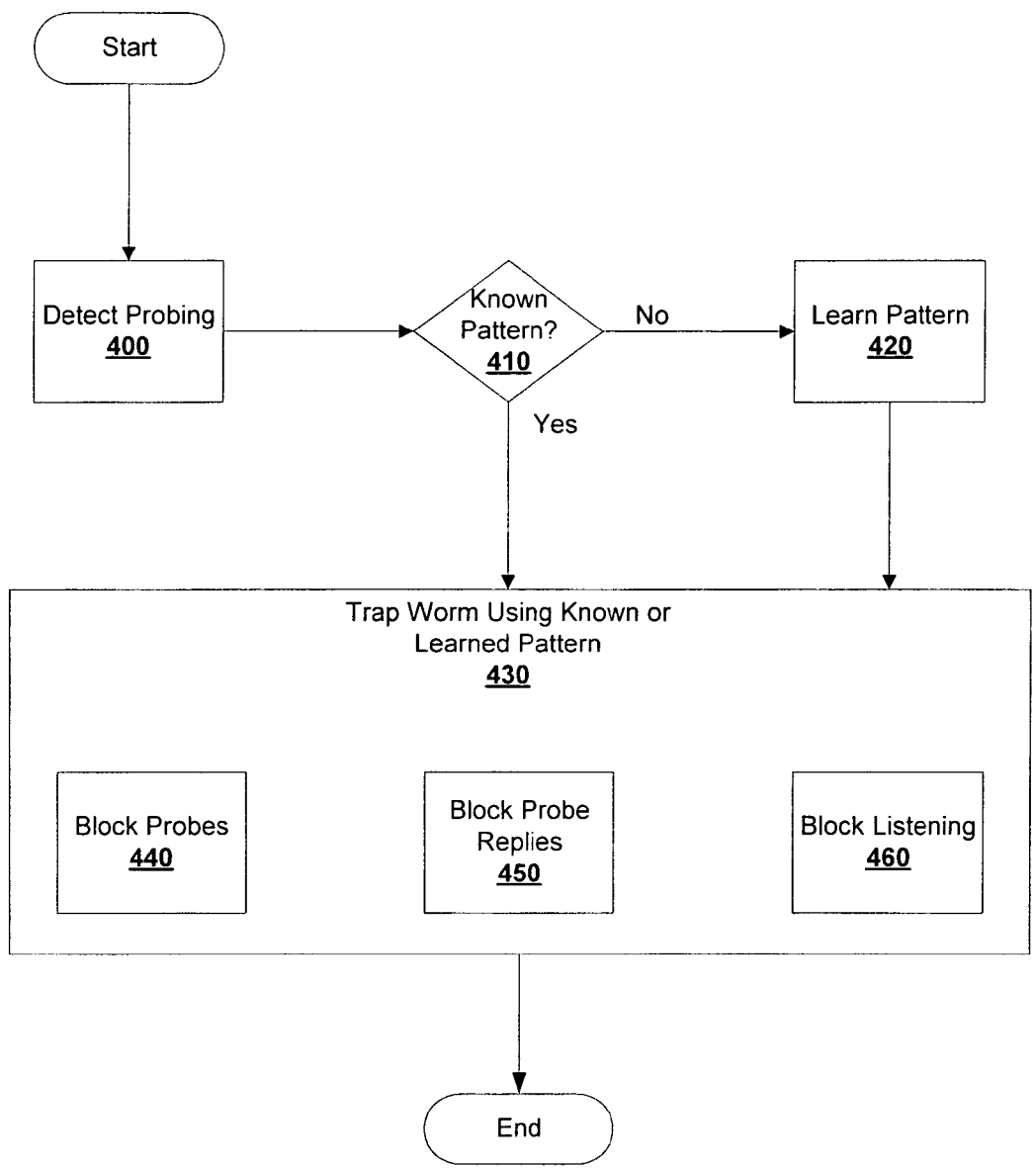
FIG. 4 is a flowchart illustrating operations for trapping a worm according to certain embodiments of the present invention.

FIG. 4 is a flow chart that further illustrates operations that may be used to trap an electronic worm in an infected computer according to embodiments of the present invention. As shown in FIG. 4, operations may start with the detection of probes that have been sent out by the worm (block 400). Then, the pattern of the probes and/or the contents of the probe can be examined to determine if the probing follows the expected pattern of one or more known worms (block 410). If the pattern is not known, the source of the probes may be identified and then additional communications emanating from that source may be monitored. In this manner, additional probes sent from the source may be identified. These probes may then be evaluated (block 420) to identify certain patterns that are associated with the probes sent out by the worm. The types of "patterns" that may be identified include the information that is contained in one or more probes, the frequency at which probes are sent, the types of computers the probes are sent to (i.e., where probes are sent to a string of sequential network or port addresses), etc. These identified probing and/or spreading patterns may then be stored in a database. By learning the probing/spreading pattern it may be possible to acquire sufficient information regarding the electronic worm such that it is possible to trap the worm in the infected computer.

As further shown in FIG. 4, once the probing/spreading pattern of the electronic worm is identified, one or more techniques may be employed in an effort to trap the worm in the infected computer (block 430). FIG. 4 illustrates three exemplary trapping methods (see blocks 440, 450, 460). The first of these trapping methods is to block the probes that are sent from the infected computer (block 440). This may be accomplished, for example, by examining communication emanating from the infected computer (e.g., at a modem, gateway or network router) and not forwarding any communications that appear to be worm probes. By blocking all of the worm's probes, the ability of the worm to propagate can typically be eliminated.

One potential problem with probe blocking is that legitimate communications that are emanating from the infected computer (i.e., communications that are not being sent by the worm) may be blocked. Accordingly, in some instances it may be possible to use the known or learned patterns regarding the probing characteristics of the worm to distinguish between worm probes and other legitimate communications such that only the probes are blocked. By way of example, messages sent to a set or sequence of destination addresses and/or ports may be identified as probes from the electronic worm. Likewise, a sequence of destination addresses and/or ports that appears to be generated by a known or inferable algorithm or procedure (e.g., a linear offset or a more complex algorithm) may be identified as probes from the electronic worm.

Once the probes are identified, the blocking may easily be accomplished by simply deleting the probe or otherwise preventing the probe from reaching its target destination. In certain embodiments of the present invention, the probes may be rerouted using, for example, tunneling techniques, such that the probes are forwarded to a deceptive-responder that may facilitate deceiving the electronic worm so that it does not realize that countermeasures are being enacted against it.

Another potential disadvantage associated with trapping a worm by blocking its probes is that certain types of electronic worms may be able to detect that their probes are being blocked. This is because an effort to block all probes will typically mean that the worm will not receive various expected responses such as the response to handshakes that are used to set up different layers of a network connection. Since an electronic worm would almost always expect to receive such responses, the lack of such responses may, in many instances, be a clear indicator to the worm that its communications are being blocked. As discussed above, many worms are programmed to take malicious action such as erasing files on the infected computer or initiating actions that may damage hardware on the infected computer upon detection that countermeasures (such as probe blocking) are being enacted. Accordingly, in certain embodiments of the present invention, only certain types of probes may be blocked so that the electronic worm receives expected communications such as responses to handshakes and the like. This, of course, requires a more sophisticated blocking approach where either: (1) at least some types of communications are not blocked or (2) all communications are blocked, but a network element generates and sends back to the worm the responses the worm would expect to receive to certain types of communications, such as, for example, acknowledgements.

As is also shown in block 450 of FIG. 4, the electronic worm may also be trapped by blocking replies that are sent by probes that successfully intrude and infect other target computers. In many cases, an electronic worm cannot successfully transfer itself to a target machine using a single probe or will not try to because, for example, it may make it easier to detect the probes. Accordingly, a series of communications may be used to infect a target machine. The first of these communications may, for example, comprise simple probes that seek to identify an open port on a target computing device. Thus, in many instances the probe will not actually comprise data packets, but instead may be a communication that starts the process of establishing a virtual connection. By way of example, one way to probe for an open port is to send out TCP protocol packets (e.g., an "SYN" packet"). When this packet is received at an open port, the target computer will send out a TCP response packet (an "ACK" or acknowledgment) back to the sending port as part of the TCP "handshaking" procedure that establishes a connection at the TCP layer of the communications architecture. Once an open port is identified, many electronic worms may then attempt to send a small segment of code to the target computer through the open port. This code segment may then exploit a known vulnerability in the target computer to take over control of the target machine sufficiently to allow the electronic worm to send a complete replica of itself to the target machine. Thus, in many instances a whole series of probes/communications are sent and received to accomplish replication of the electronic worm on the target computer.

According to certain embodiments of the present invention, probe responses may be blocked (as opposed to simply blocking the probes themselves), for example, by deleting and/or rerouting communications that have (1) a destination address that corresponds to a computer that is known to be infected by the electronic worm and (2) a source address which is the same as a previously used probe destination address. All such communications may be deleted or rerouted, or individual communications may be examined to determine if they appear to comprise a probe response (i.e., by correlating the communications with known types of probe responses associated with the particular electronic worm at issue).

One potential advantage of trapping the worm in the infected computer by blocking the responses to probes is that the worm may not notice that it is being blocked. In particular, while, as discussed above, many electronic worms will realize when their probes are being blocked, it may be more difficult to determine that probe responses are being blocked because the lack of responses may simply be an indication that there were no vulnerable targets to infect. Thus, except in situations where the electronic worm knew it should (or perhaps probably should) receive one or more replies, many electronic worms will not realize that responses to their probes are being blocked. As discussed above, this may be beneficial because if the worm does not realize that countermeasures are being enacted against it, it is less likely that the worm will initiate harmful actions such as deleting data and/or files on the infected computer.

Finally, as illustrated at block 460 of FIG. 4, yet another potential method for trapping an electronic worm in an infected computer may be to block the worm from "listening." This may be accomplished, for example, by blocking all of the listening ports on a computer infected with the electronic worm. When this is done, the worm stops receiving any communications from the outside world, including any communications from the creator of the worm. However, since in many instances an electronic worm will not expect to receive such communications, the worm may not realize that communications to it have been blocked, but instead may simply assume that it has not yet been contacted.

Figure 5:
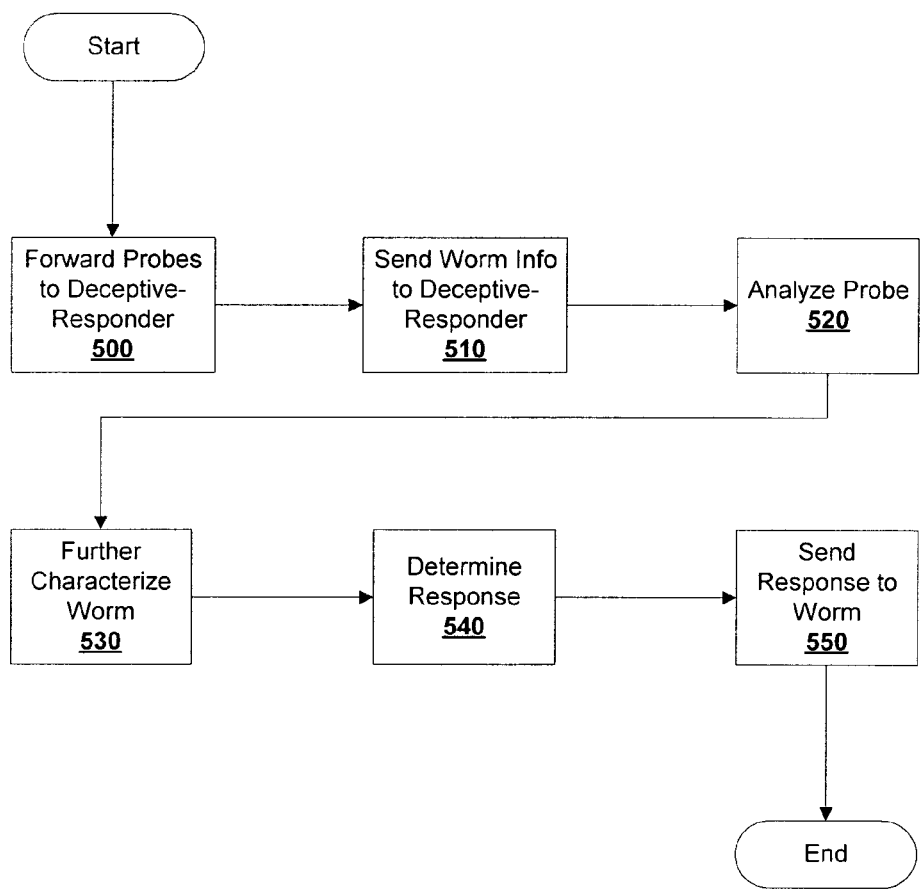
FIG. 5 is a flowchart illustrating operations for deceiving a worm according to certain embodiments of the present invention.

FIG. 5 is a flow chart that further illustrates exemplary methods of deceiving an electronic worm according to certain embodiments of the present invention. As shown in block 500 of FIG. 5, operations may begin by forwarding intercepted probes from the worm to a deceptive responder. As discussed in more detail herein, the term "deceptive-responder" refers to a software and/or hardware unit that configures and sends responses to worm probes in an effort to deceive electronic worms into not realizing that their communications are being intercepted. In various embodiments of the present invention, the functional units that physically intercept electronic worm probes (e.g., probe detectors) may not be physically located at the same location as the deceptive-responder, since it may be more effective to locate probe detectors at, for example, network security gateways and/or on individual computers and have a single deceptive-responder located at a centralized location within the network. As such, in these embodiments of the invention, the intercepted probes may be physically forwarded to a deceptive-responder.

As illustrated at block 510 of FIG. 5, when a probe is forwarded from, for example, a probe detector to the deceptive-responder, various aspects of the initial intercepted communication may be preserved. In particular, the source and destination addresses and ports specified in the probe as originally sent may be preserved, as this information may be useful in both deceptively responding to probes and/or in identifying other infected computers. Accordingly, the entire original probe may be embedded within another communication that forwards the probe to the deceptive-responder. This communication may further include any additional information about the probe and/or the suspected worm that sent the probe that the probe detector was able to ascertain such as, for example, the name or identification number of the suspected worm, the type of worm and/or the general class to which the suspected worm belongs.

As is further shown in FIG. 5, the deceptive-responder may perform further analysis of the probe forwarded to it (block 520). If the electronic worm associated with the probe has not already been identified, the deceptive-responder may further attempt to identify the worm via more detailed correlation of the probe with information regarding known electronic worms and the characteristics thereof and/or by examining a series of probes sent by the infected computer which may enable a more specific identification of the electronic worm present on the infected computer (block 530). If the deceptive-responder is successful in further characterizing the electronic worm, it may send this refined characterization to additional components of the worm trapping system such as, for example, the probe detector(s) and or a central correlation unit (which is discussed below).

Next, as shown at block 540 of FIG. 5, the deceptive responder may prepare a response to the probe. As discussed above, by preparing and sending such responses, the deceptive-responder may be able to deceive the electronic worm such that the worm does not realize its communications are being intercepted or that it is trapped and unable to infect additional computers. In certain embodiments of the present invention, a database of information may be maintained which includes the types of responses that should be sent to specific probes forwarded by various known types of electronic worms. Using the identification of the worm and the specific characteristics of the probe at issue, the deceptive-responder may consult this database to ascertain the format of a probe response that is likely to be accepted by the worm as a real response to its probe. This response, which may be a mimicked response, is then generated and sent to the worm by the deceptive responder (block 550).

In some instances, the deceptive-responder may not be able to fully identify the worm, or may encounter a completely new worm that it is not able to identify at all. In these situations, the deceptive-responder may still formulate and send probe responses to the worm in an effort to deceive the worm and/or in an effort to identify responses that will be effective. For example, if the electronic worm is identified as being similar, but not identical, to a known type of worm, the deceptive-responder might send a probe response to the worm that was identical to the probe response that it would send to the similar worm. This may or may not work. However, the deceptive-responder can keep track of what responses appear to be effective or ineffective and use this information to learn the appropriate responses to send to newly identified electronic worms. If a particular response is deemed to have been ineffective, the deceptive-responder can try variants thereof in response to future probes and/or try a completely different response.

Pursuant to still further embodiments of the present invention, the deceptive-responder may also keep track as to how far along a "conversation" (i.e., a series of probes and probe responses) has progressed with a particular worm at a particular infected computer. As a result, if the worm transforms at known (or unknown) intervals during their lifespan, the history of the probes and responses may make it possible to identify when such changes are likely to occur. Keeping track of the requests and responses may also be useful in identifying new variants of known worms which at some point in their lifecycle exhibit new behavior, and in formulating countermeasures that are effective in trapping any such new worm variants.

Figure 6:
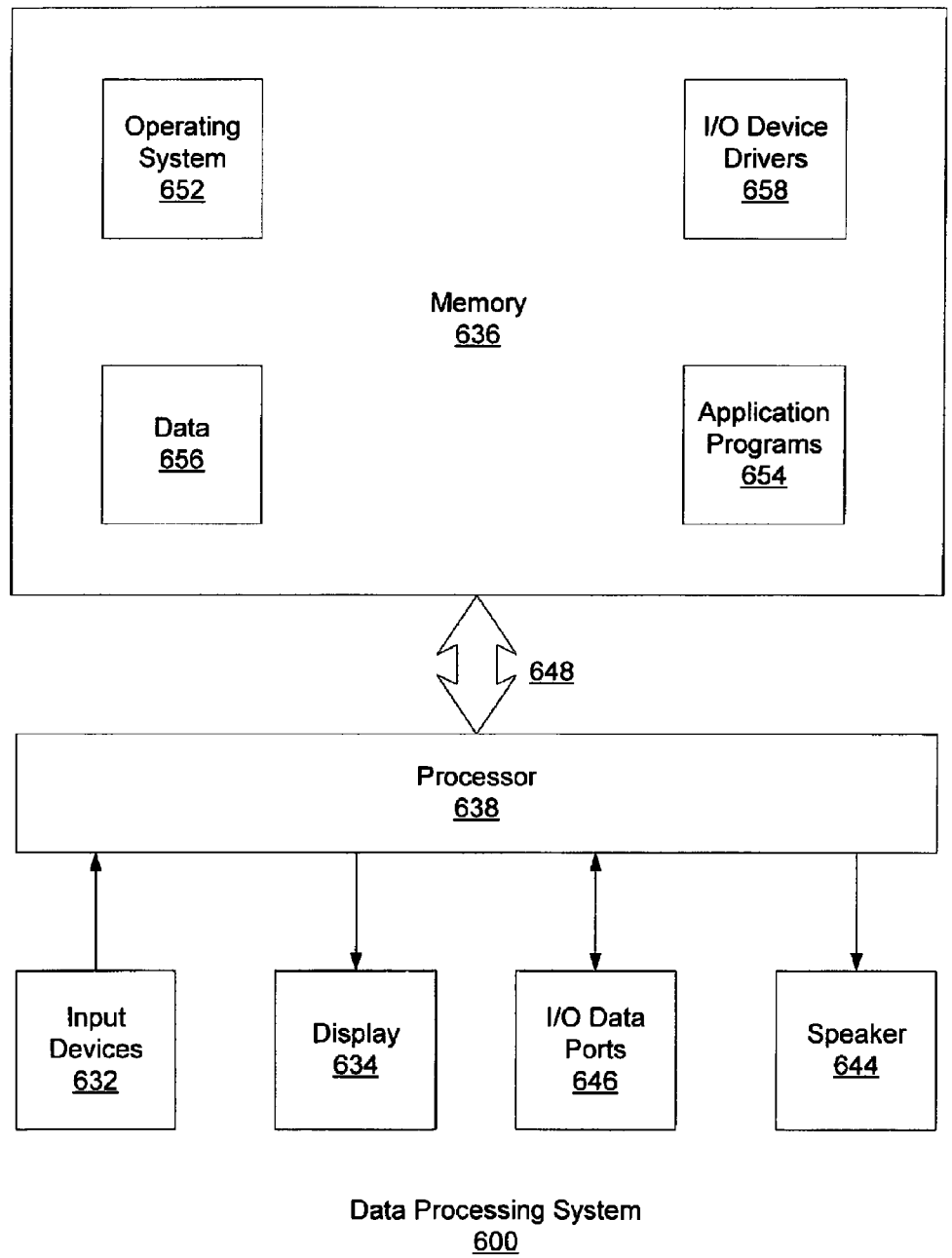
FIG. 6 is a block diagram of a data processing system suitable for use in embodiments of the present invention.

An exemplary system for trapping electronic worms according to certain embodiments of the present invention will now be described with respect to FIGS. 6 and 7. FIG. 6 is a block diagram illustrating a data processing system (or computer program product) 600 in accordance with embodiments of the present invention. The data processing system 600 may include input device(s) 632 such as a keyboard or keypad, a display 634, and a memory 636 that communicate with a processor 638 via an address/data bus 648. The processor 638 can be any commercially available or custom microprocessor. The data processing system 600 may further include a speaker 644, and I/O data ports 646 that also communicate with the processor 638. The I/O data ports 646 can be used to transfer information between the data processing system 600 and another computer system or a network. These components may be conventional components, such as those used in many conventional data processing systems, which may be configured to operate as described herein.

The memory 636 is representative of the overall hierarchy of memory devices containing the software and data used to implement the functionality of the data processing system 600. The memory 636 can include, but is not limited to, the following types of devices: cache, ROM, PROM, EPROM, EEPROM, flash memory, SRAM, and DRAM. As shown in FIG. 6, the memory 636 may include several categories of software and data used in the data processing system 600: an operating system 652; application programs 654; input/output (I/O) device drivers 658; and data 656. As will be appreciated by those of skill in the art, the operating system 652 may be any operating system suitable for use with a data processing system, such as, for example, OS/2, AIX, System390 or Z/OS from International Business Machines Corporation, Armonk, N.Y., Windows95, Windows98, Windows2000, Windows CE or WindowsXP from Microsoft Corporation, Redmond, Wash., VxWorks, Cisco IOS, Palm OS, Symbian OS, Unix or Linux. The I/O device drivers 658 typically include software routines accessed through the operating system 652 by the application programs 654 to communicate with devices such as the I/O data port(s) 646 and certain memory 636 components. The application programs 654 are illustrative of the programs that implement the various features of the data processing system 600. Finally, the data 656 represents the static and dynamic data used by the application programs 654, the operating system 652, the I/O device drivers 658, and other software programs that may reside in the memory 636.

While in the exemplary embodiment of FIG. 6 the functionality for trapping electronic worms is implemented in a single data processing system 600, as will be appreciated by those of skill in the art, the illustrated functionality and data may be distributed across one or more data processing systems, as is illustrated below in the context of FIG. 7. It will also be appreciated that various applications could be incorporated into the operating system 652 or some other logical division of the data processing system 600. Thus, the present invention should not be construed as limited to the configuration of FIG. 6, but is intended to encompass any arrangement, division of functions between data processing systems and/or configuration capable of carrying out the operations described herein.

Figure 7:
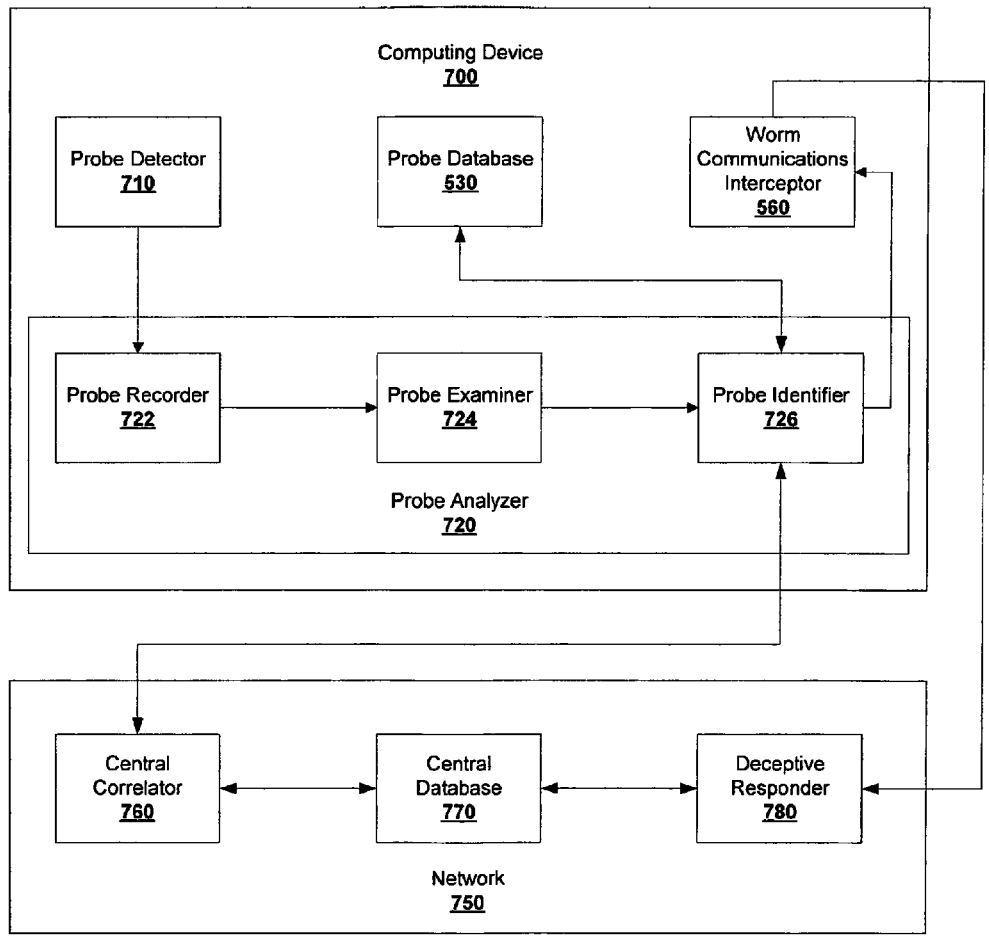
FIG. 7 is a block diagram of a system for deceptively trapping electronic worms according to certain embodiments of the present invention.

FIG. 7 depicts an exemplary system for trapping electronic worms according to certain embodiments of the present invention. As shown in FIG. 7, this exemplary system includes a first set of components that are implemented on a computing device 700 and a second set of components that are implemented elsewhere within a network 750. The computing device 700 can, for example, be a computing device such as the computing device discussed above with reference to FIG. 6 that includes the various application packages and data sets that are depicted as part of block 700 in FIG. 7. The computing device may, for example, comprise a network server that serves as a gateway between a plurality of computers and a larger network or an individual personal computer. Each of the components implemented in the network 750 may likewise be implemented on a computing device such as the computing device depicted in FIG. 6.

As shown in FIG. 7, the computing device 700 includes a probe detector 710. The probe detector 710 may comprise hardware and/or software that is configured to monitor outbound traffic (e.g., traffic from computers that are part of a local area network) for evidence of probes sent from an electronic worm. The computing device 700 further includes a probe analyzer 720. The probe analyzer 720 may comprise software and/or hardware that performs one or more of several different functions. First, the probe analyzer 720 may include a probe recorder 722 that is configured to record information regarding apparent probes from an electronic worm that are detected by the probe detector 710. The probe analyzer 720 may further include a probe examiner 724 that examines probes identified by the probe detector 710 to identify various characteristics of the probe. The probe analyzer 720 may also include a worm identifier 726 that attempts to identify the class and/or specific name/type of worm that is resident on a potentially infected computer based on the characteristics of one or more of the probes sent by that computer as determined by, for example, the probe examiner 724.

As shown in FIG. 7, the computing device 700 may further include a probe database 730. This probe database 730 may store information regarding various characteristics of probes. In certain embodiments of the present invention, the probe characteristics are indexed by worm identification number. The probe database 730 may be periodically updated with information from, for example, a central correlator 760 (see description below). The worm identifier 726 may access the information in the probe database 730 as part of the worm identification process (at least for known worms). If the information in the probe database 730 combined with any other information available to the worm identifier 726 is insufficient to identify the worm at a particular infected computer, that worm may be flagged (i.e., identified) as a "previously unknown" worm. As discussed below, the worm identifier 726 may also send information regarding identified worms to the central correlator 760.

The computing device 700 may further include a worm communications interceptor 740. The worm communications interceptor 740 may receive probe blocking and or interception commands from, for example, the worm identifier 726. These blocking and/or interception commands may be generated by the worm identifier 726 (or some other functional unit of the worm trapping system) by application of rules that are chosen based, for example, on the type of worm resident on the infected computer as determined by the worm identifier 726. In response to these blocking and/or interception commands, the worm communications interceptor 740 may perform one or more trapping techniques such as, for example, blocking probes, blocking replies to probes and/or blocking listening. The worm communications interceptor 740 may also tunnel intercepted worm communications to the deceptive-responder 780 to facilitate deceptive trapping.

As noted above, several additional elements of the worm trapping system are implemented in the network 750 in this exemplary embodiment of the present invention. The first such element may be a central correlator 760. The central correlator 760 may receive summaries regarding probe activity and/or identified worm types currently infecting computers in the network 750 from a plurality of trapping-enabled sources (i.e., computing devices with functionality for trapping electronic worms) such as the computing device 700. The central correlator 760 may then be used to correlate information on worm and probe activity across the plurality of trapping-enabled sources (which may be spread out across one or more networks) to help better verify the presence and/or absence of worm contagions and to better learn the actual probing patterns which may be used in detecting and eradicating new worms in the future. As the central correlator 760 develops this information it may send some or all of the new information back to one or more of the trapping-enabled sources such as computing device 700 (e.g., to the probe identifier 726) so as to update and improve initial detection of worms at the trapping-enabled sources.

A central database 770 may also be provided in the network 750. It may be co-resident with the central correlator 760. The central database 770 may be used, for example, to store probe and probe response characteristics, indexed by worm name/type/class identification number or numbers, as such information is detected and recorded in the trapping-enabled sources and forwarded to the central correlator 760. The central correlator 760 may access the stored information in the central database 770 in performing correlations that are used, for example, to verify the presence of a worm in the network.

Additionally, a deceptive-responder 780 may be provided in the network. As discussed above, the deceptive-responder 780 may receive tunneled worm communications from, for example, the worm communications interceptor 740. The deceptive-responder may then analyze such communications, may consult the central database 770, and may then formulate and send responses to the worm communications in an effort to deceptively trap the worm.

While the embodiment of the present invention depicted in FIG. 7 shows one possible way of splitting where the functionality of the worm trapping system is implemented, it will be appreciated that many different implementations are possible. In fact, the functionality may be implemented entirely within the network, entirely within one or more client computers or in other ways without departing from the scope of the present invention. Accordingly, it will be appreciated that the above description of the various elements included as part of one exemplary embodiment of the invention and the location of those elements is not intended to be limiting, but instead is provided to fully enable persons of skill in the art to practice various embodiments of the present invention.

EXAMPLE

A service provider may provide a worm protection software package which, if ordered by a client, can be installed on the client's computer, for example, via an installation from a compact disc or via a download. The installed software may, for example, include each of the functional elements depicted as part of computing device 700 in FIG. 7. At some later point in time, the installed software on the customer's computer may detect probing (e.g., via a probe detector 710) and may be successful in identifying the specific type of worm (e.g., via the worm identifier 726) that is performing the probing.

Once the worm is identified, the task of identifying worm communications may be made easier such that worm communications may be readily intercepted (e.g., by the worm communications interceptor 740) and tunneled to a deceptive responder 780 provided in the network by the service provider. The deceptive responder 780 analyzes these intercepted probes and formulates replies thereto which are sent back to the worm in an effort to deceptively trap the worm in the client's computer. The deceptive responder or another network element provided by the service provider (such as, for example, a central correlator 760) may also more specifically identify the worm.

Information regarding the worm detection and the type of worm identified are provided to the central correlator 760. If a specific worm identification number can eventually be associated with the worm by, for example, the client software package or the deceptive-responder 780, this information is also forwarded to the central correlator 760. The collected information may then be distributed to the client software packages resident on a plurality of client computers to facilitate better and quicker detection of worms at each client computer.

As noted above, the deceptive-responder sends false responses to each probe sent by the worm. Initially, the responses may not make sense to the worm. However, as the type of worm is more clearly identified, the deceptive-responder may be able to match its false responses more closely to the responses expected by the worm. If and when the deceptive-responder is able to accurately provide (falsified) responses to each probe in a format that the worm expects the worm may be effectively trapped within the client's computer. The service provider may then alert the client (e.g., via e-mail) regarding the presence of the worm. The service may further provide the client instructions for removing the worm from the client's computer.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of trapping electronic worms, the method comprising:
    detecting an electronic worm in an infected computer; comprising examining outbound network communications from the computer to identify a non-spoofed probe being sent by the electronic worm to one or more target computers;
    trapping the electronic worm, comprising at least one of the following:
    blocking further outbound non-spoofed probing by the electronic worm;
    blocking inbound replies to previously sent outbound non-spoofed probes;
    blocking efforts by the electronic worm to perform an initial intrusion into vulnerable target computers;
    blocking efforts by the electronic worm to transfer itself to the target computers;
    forwarding the identified non-spoofed probe to a deceptive-responder that is remote from the infected computer and the target computers; and
    communicating with the trapped electronic worm via the deceptive responder, comprising sending the electronic worm a mimicked response to the non-spoofed probe in a format that the electronic worm is expecting to receive.

2. The method of claim 1, further comprising:
collecting information on the actions of the electronic worm; and
correlating the collected information with a data repository of information on the actions of known electronic worms.

3. The method of claim 2, further comprising:
identifying the electronic worm as one of a known type of electronic worm based on the correlation of the collected information with the information in the data repository.

4. The method of claim 2, further comprising updating the data repository to include at least some of the collected information on the actions of the electronic worm.

5. The method of claim 1, wherein information regarding a probing pattern of the electronic worm is used to select a format for the mimicked response.

6. The method of claim 1 wherein forwarding the identified non-spoofed probe to the deceptive-responder comprises forwarding an original source address and an original destination address of the non-spoofed probe.

7. The method of claim 1, further comprising:
receiving a plurality of communications sent by the electronic worm;
analyzing the received communications; and
identifying the electronic worm based on the analysis of the received communications.

8. A system for trapping electronic worms, comprising:
an infected computer on a network;
one or more target computers on the network;
a probe detector connected to the network that examines outbound network communications from the infected computer on the network to detect and identify a non-spoofed probe sent by an electronic worm on the infected computer to one or more target computers on the network;
a database containing information on the non-spoofed probe characteristics of a plurality of known types of worms;
a probe analyzer coupled to the non-spoofed probe detector and to the database;
a worm communications interceptor responsive to the probe analyzer and configured to trap the electronic worm, trapping the electronic worm comprising at least one of the following:
blocking further outbound non-spoofed probing by the electronic worm;
blocking inbound replies to previously sent outbound non-spoofed probes;
blocking efforts by the electronic worm to perform an initial intrusion into vulnerable target computers;
blocking efforts by the electronic worm to transfer itself to the target computers;
forwarding the identified non-spoofed probe to a deceptive-responder that is remote from the infected computer and the one or more target computers; and
wherein the worm communications interceptor further configured to intercept the non-spoofed probe to prevent the electronic worm from reaching an intended destination; and the deceptive-responder is responsive to the worm communications interceptor and configured to send the electronic worm a mimicked response to the non-spoofed probe in a format that the electronic worm is expecting to receive.

9. The system of claim 8, wherein the probe analyzer examines the non-spoofed probe to identify one or more characteristics of the non-spoofed probe; and identifies a worm type based on the identified characteristics of the probe.

10. The system of claim 8, further comprising a central correlator configured to receive information from the worm communications interceptor regarding a probe sent by the electronic worm and to correlate the received information with information on probe characteristics of a plurality of known types of worms contained in a central database.

* * * * *